(12) United States Patent
Jiang

(10) Patent No.: US 12,001,758 B2
(45) Date of Patent: Jun. 4, 2024

(54) VOICE INFORMATION PROCESSING METHOD AND ELECTRONIC DEVICE

(71) Applicant: GUANGDONG OPPO MOBILE TELECOMMUNICATIONS CORP., LTD., Guangdong (CN)

(72) Inventor: Yi Jiang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/934,260

(22) Filed: Sep. 22, 2022

(65) Prior Publication Data

US 2023/0010969 A1 Jan. 12, 2023

Related U.S. Application Data

(63) Continuation of application No. PCT/CN2021/081332, filed on Mar. 17, 2021.

(30) Foreign Application Priority Data

May 18, 2020 (CN) .......................... 202010419583.7

(51) Int. Cl.
*G06F 3/16* (2006.01)
*G06F 3/04815* (2022.01)
(Continued)

(52) U.S. Cl.
CPC .......... *G06F 3/167* (2013.01); *G06F 3/04815* (2013.01); *G06F 9/54* (2013.01);
(Continued)

(58) Field of Classification Search
CPC .... G06F 3/167; G06F 40/205; G06F 3/04815; G06F 9/54; G10L 13/08; G10L 15/26
See application file for complete search history.

(56) References Cited

U.S. PATENT DOCUMENTS

2009/0271205 A1* 10/2009 Finn .................. G06Q 30/0281
705/346
2016/0155443 A1 6/2016 Khan et al.
(Continued)

FOREIGN PATENT DOCUMENTS

CN 101601040 A 12/2009
CN 103558916 2/2014
(Continued)

OTHER PUBLICATIONS

WIPO, International Search Report and Written Opinion for PCT/CN2021/081332, Apr. 27, 2021.
(Continued)

*Primary Examiner* — Sherrod L Keaton
(74) *Attorney, Agent, or Firm* — Hodgson Russ LLP

(57) ABSTRACT

A voice information processing method and an electronic device are provided. The voice information processing method may include: a first device (1100) obtains first voice information, and when the first voice information includes a wakeup keyword, the first device (1100) sends a voice assistant wakeup instruction to a second device (1200), such that the second device (1200) launches a voice assistant; then the first device (1100) obtains second voice information and sends the second voice information to the second device (1200), the second device (1200) determines a voice triggered event corresponding to the second voice information by using the voice assistant, and feeds target information associated with performance of the voice triggered event back to the first device (1100), such that the first device (1100) performs the voice triggered event based on the target information. The method can reduce the computing burden of the first device (1100).

9 Claims, 6 Drawing Sheets

(51) Int. Cl.
  *G06F 9/54* (2006.01)
  *G06F 40/205* (2020.01)
  *G10L 13/08* (2013.01)
  *G10L 15/26* (2006.01)
(52) U.S. Cl.
  CPC ............ *G06F 40/205* (2020.01); *G10L 13/08* (2013.01); *G10L 15/26* (2013.01)

(56) References Cited

U.S. PATENT DOCUMENTS

| | | | |
|---|---|---|---|
| 2016/0173578 A1* | 6/2016 | Sharma | H04L 51/00 709/203 |
| 2018/0293982 A1 | 10/2018 | Xiang et al. | |
| 2018/0322870 A1* | 11/2018 | Lee | H04N 21/4394 |
| 2021/0097776 A1* | 4/2021 | Faulkner | G06V 40/28 |

FOREIGN PATENT DOCUMENTS

| | | |
|---|---|---|
| CN | 105329187 A | 2/2016 |
| CN | 106469040 A | 3/2017 |
| CN | 106653018 | 5/2017 |
| CN | 107004412 A | 8/2017 |
| CN | 107978316 | 5/2018 |
| CN | 108470014 A | 8/2018 |
| CN | 109255064 | 1/2019 |
| CN | 110444211 A | 11/2019 |
| CN | 110460833 | 11/2019 |
| CN | 111096680 | 5/2020 |
| CN | 111161714 A | 5/2020 |
| CN | 111694605 | 9/2020 |
| WO | 2015066949 | 5/2015 |

OTHER PUBLICATIONS

EPO, Extended European Search Report for EP Application No. 21807986.1, Jul. 17, 2023.
CNIPA, Office Action for CN Application No. 202010419583.7, Mar. 10, 2023.
EPO, Extended European Search Report for EP Application No. 21807986.1, Oct. 18, 2023.
CNIPA, Second Office Action for CN Application No. 202010419583.7, Dec. 1, 2023.
CNIPA, Rejection Decision for CN Application No. 202010419583.7, Mar. 13, 2024.

* cited by examiner

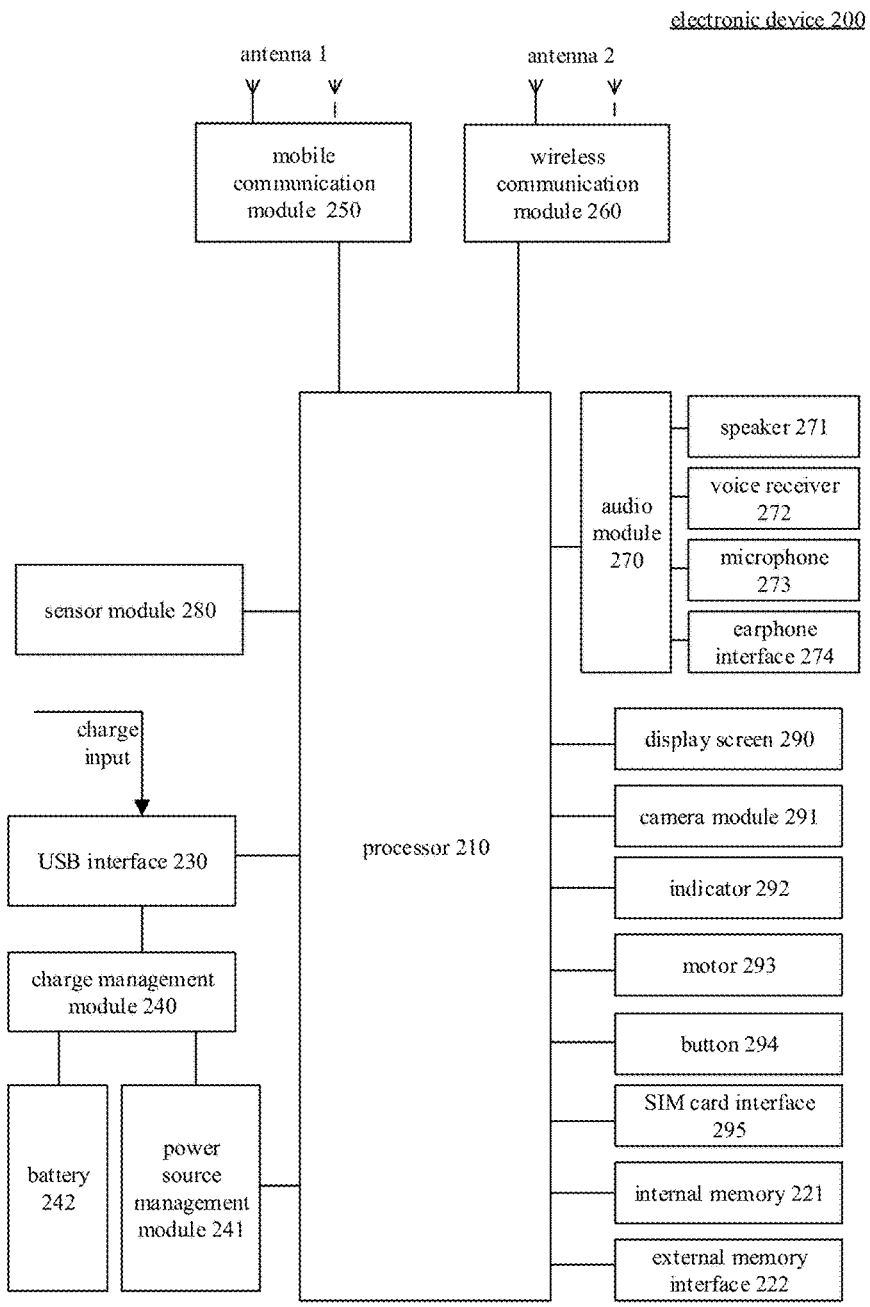

VOICE INFORMATION PROCESSING METHOD AND ELECTRONIC DEVICE

CROSS-REFERENCE TO RELATED APPLICATION

The present disclosure is a continuation of International Patent Application No. PCT/CN2021/081332, filed Mar. 17, 2021, which claims priority to Chinese Patent Application No. 202010419583.7, filed May 18, 2020, the entire disclosures of which are incorporated herein by reference.

TECHNICAL FIELD

The present disclosure relates to the field of voice processing technology, particularly to a voice information processing method and an electronic device.

BACKGROUND

As a kind of wearable device, a smart glass combines computer technology with traditional glass to achieve abundant functions. One of these functions is man-machine interaction through voice. The introduction of voice processing process has greatly increased the ease of use of the smart glass.

At present, the voice processing process relies on the processor equipped in the smart glass. However, due to the limitation of computation power of the processor of the smart glass, when the smart glass is performing voice processing, the problem of poor recognition and poor interaction often occurs. If the smart glass is equipped with a high-performance processor, then the cost of the smart glass will be increased, which is unacceptable to ordinary users.

SUMMARY

According to a first aspect of the present disclosure, a voice information processing method performed by a first device is provided. The voice information processing method may include: obtaining first voice information; sending, in response to the first voice information including a wakeup keyword, a voice assistant wakeup instruction to the second device, the voice assistant wakeup instruction is configured to make the second device launch the voice assistant; obtaining second voice information; sending the second voice information to the second device, the second device determines a voice triggered event corresponding to the second voice information by using the voice assistant; and receiving target information fed back by the second device, and performing the voice triggered event based on the target information.

According to a second aspect of the present disclosure, a voice information processing method performed by a second device is provided. The voice information processing method may include: launching a voice assistant in response to a voice assistant wakeup instruction, the voice assistant wakeup instruction is sent, in response to the first device determining that first voice information includes a wakeup keyword, by a first device to the second device; obtaining second voice information sent by the first device; determining the voice triggered event corresponding to the second voice information by using the voice assistant; and feeding target information associated with the performance of the voice triggered event back to the first device, such that the first device may perform the voice triggered event based on the target information.

According to a third aspect of the present disclosure, an electronic device is provided. The electronic device may include a processor and a memory. The memory is configured to store one or more programs. The electronic device may be able to be used as a first device, such that when the processor executes the one or more programs, the processor is enabled to implement the a voice information processing method performed by the first device. The voice information processing method performed by the first device may include: obtaining first voice information; sending, in response to the first voice information including a wakeup keyword, a voice assistant wakeup instruction to the second device, the voice assistant wakeup instruction is configured to make the second device launch the voice assistant; obtaining second voice information; sending the second voice information to the second device, the second device determines a voice triggered event corresponding to the second voice information by using the voice assistant; and receiving target information fed back from the second device, and performing the voice triggered event based on the target information. The electronic device may be able to be used as the second device, such that when the processor executes the one or more programs, the processor is enabled to implement the a voice information processing method performed by the second device. The voice information processing method performed by the second device may include: launching the voice assistant in response to the voice assistant wakeup instruction, the voice assistant wakeup instruction may be sent, in response to the first device determining that first voice information includes a wakeup keyword, by the first device to the second device; obtaining the second voice information sent by the first device; determining the voice triggered event corresponding to the second voice information by using the voice assistant; and feeding the target information associated with the performance of the voice triggered event back to the first device, such that the first device may perform the voice triggered event based on the target information.

BRIEF DESCRIPTION OF THE DRAWINGS

FIG. 1 illustrates a schematic diagram of an exemplary system architecture for applying a voice information processing scheme according to an embodiment of the present disclosure.

FIG. 2 illustrates a schematic structural diagram of an electronic device suitable for implementing an embodiment of the present disclosure.

DETAILED DESCRIPTION

Figure 3:
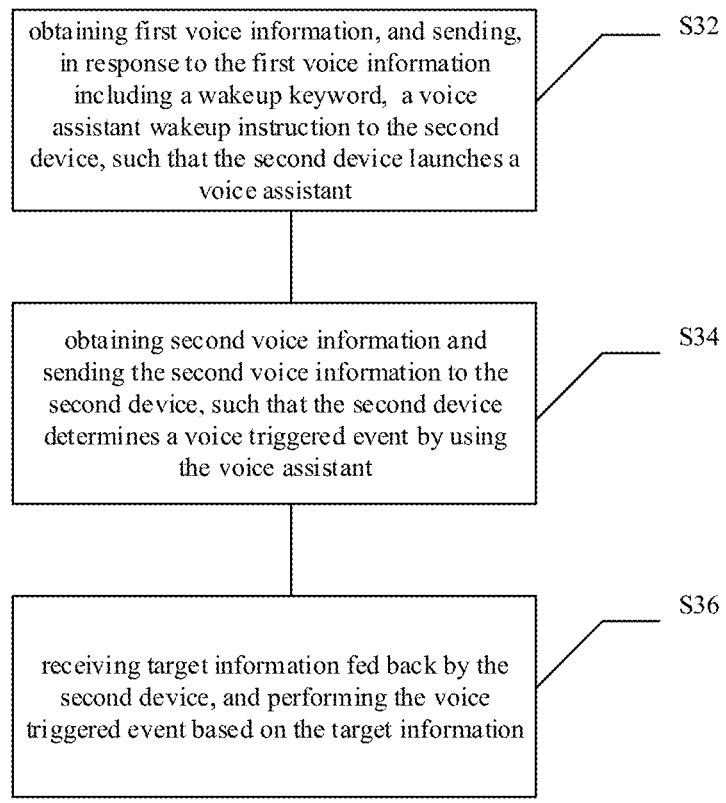
FIG. 3 schematically illustrates a flowchart of a voice information processing method performed by a first device according to an exemplary embodiment of the present disclosure.

The exemplary embodiments will now be described more thoroughly with reference to the accompanying drawings. However, the exemplary embodiments can be implemented in a variety of forms, and should not be construed as being limited to the examples set forth herein. Rather, these embodiments are provided to make the present disclosure more comprehensive and complete, and to communicate the ideas of the exemplary embodiments to those skilled in the art in a comprehensive manner. The features, structures or characteristics described can be combined in one or more embodiments in any suitable manner. In the following description, many specific details are provided to offer a full understanding of the embodiments of the present disclosure. However, those skilled in the art will appreciate that, it is possible to practice the technical schemes of the present disclosure while omitting one or more of the particular details described, or other methods, components, apparatuses, steps, etc. may be employed to practice the technical schemes of the present disclosure. In other instances, the well-known technical solutions are not shown or described in detail, to avoid providing too much noisy information and obscuring aspects of the present disclosure.

In addition, the accompanying drawings are only schematic illustrations of the present disclosure and are not necessarily drawn to scale. Identical references in the drawings indicate identical or similar parts, and thus repetitive descriptions thereof will be omitted. Some of the block diagrams shown in the accompanying drawings are functional entities, and do not necessarily correspond to physically or logically independent entities. These functional entities may be implemented in the form of software, in one or more hardware modules or in integrated circuits, or in different networks and/or processor apparatuses and/or micro-control apparatuses.

The flowcharts shown in the accompanying drawings are only exemplary illustrations and do not have to include all of the steps. For example, some steps may be split, while other steps may be combined or partly combined, thus the actual execution order may be changed depending on actual situations. In addition, all the terms "first" and "second" below are merely used for the purpose of distinction, and should not be used as a limitation to the present disclosure.

In some embodiments, a voice information processing method performed by a first device may include: obtaining first voice information, and sending, in response to the first voice information comprising a wakeup keyword, a voice assistant wakeup instruction to a second device, such that the second device launches a voice assistant; obtaining second voice information, and sending the second voice information to the second device, such that the second device determines a voice triggered event by using the voice assistant, the voice triggered event may correspond to the second voice information; and receiving target information fed back from the second device, and performing the voice triggered event based on the target information.

In some embodiments, in response to the second device launching the voice assistant, the voice information processing method may further include: receiving a three-dimensional interface image of the voice assistant, the three-dimensional interface image of the voice assistant may be rendered and generated by the second device; and displaying the three-dimensional interface image of the voice assistant at a display of the first device.

In some embodiments, the first device and the second device may be connected via USB; the obtaining the second voice information, and sending the second voice information to the second device may include: obtaining the second voice information; and sending the second voice information to the second device through USB redirection.

In some embodiments, the voice information processing method may further include: receiving a three-dimensional interface image corresponding to the voice triggered event, the three-dimensional interface image corresponding to the voice triggered event may be rendered and generated by the second device; and displaying the three-dimensional interface image corresponding to the voice triggered event at a display of the first device.

In some embodiments, the voice information processing method may further include: starting a timer in response to sending the voice assistant wakeup instruction to the second device; and sending, in response to not obtaining the second voice information after a predefined time period, a voice assistant closing instruction to the second device, such that the second device may close the voice assistant.

In some embodiments, a voice information processing method performed by a second device may include: launching a voice assistant in response to a voice assistant wakeup instruction, the voice assistant wakeup instruction may be sent by a first device to the second device in response to the first device determining that first voice information includes a wakeup keyword; obtaining second voice information sent by the first device, and determining, by using the voice assistant, a voice triggered event corresponding to the second voice information; and feeding target information associated with performance of the voice triggered event back to the first device, such that the first device may perform the voice triggered event based on the target information.

In some embodiments, in response to launching the voice assistant, the voice information processing method may further include: sending a three-dimensional interface image of the voice assistant to the first device, such that the first device may display the three-dimensional interface image of the voice assistant at a display; and the three-dimensional interface image of the voice assistant may be rendered and generated by the second device.

In some embodiments, the first device and the second device may be connected via USB. The obtaining the second voice information sent by the first device may include: obtaining the second voice information from the first device through USB redirection.

In some embodiments, the determining, by using the voice assistant, the voice triggered event corresponding to the second voice information may include: sending, by using the voice assistant, the second voice information to a server, such that the server may determine the voice triggered event corresponding to the second voice information; and obtaining the voice triggered event determined by the server, the voice triggered event may correspond to the second voice information.

In some embodiments, the voice triggered event may be determined based on a first voice processing process performed by the server. The first voice processing process may include: converting the second voice information into text information; and performing semantic category parsing on the text information, and determining the voice triggered event corresponding to the second voice information based on results of the semantic category parsing.

In some embodiments, the voice triggered event may be determined based on a second voice processing process performed by the server. The second voice processing process may include: converting the second voice information into text information; performing semantic category parsing on the text information, and obtaining results of the semantic category parsing; determining a response text corresponding to the second voice information based on the results of the semantic category parsing; and converting the response text to third voice information as information comprised in the voice triggered event.

In some embodiments, in response to determining, by using the voice assistant, the voice triggered event corresponding to the second voice information, the voice information processing method may further include: sending a three-dimensional interface image corresponding to the voice triggered event to the first device, such that the first device may display the three-dimensional interface image corresponding to the voice triggered event at a display; and the three-dimensional interface image corresponding to the voice triggered event may be rendered and generated by the second device.

In some embodiments, the voice information processing method may further include: closing the voice assistant in response to the voice assistant closing instruction.

In some embodiments, the voice information processing apparatus applied to a first device may include a wakeup triggering module, a voice sending module and an event performing module. The wakeup triggering module may be configured to: obtain first voice information; and send, in response to the first voice information including a wakeup keyword, a voice assistant wakeup instruction to a second device, such that the second device may launch a voice assistant. The voice sending module may be configured to: obtain second voice information, and send the second voice information to the second device, such that the second device may determine a voice triggered event by using the voice assistant. The voice triggered event may correspond to the second voice information. The event performing module may be configured to receive target information fed back from the second device, and perform the voice triggered event based on the target information.

In some embodiments, the voice information processing apparatus may further include an image displaying module. The image displaying module may be configured to: receive a three-dimensional interface image of the voice assistant in response to the second device launching the voice assistant, the three-dimensional interface image of the voice assistant may be rendered and generated by the second device; and display the three-dimensional interface image of the voice assistant at a display of the first device.

In some embodiments, the first device and the second device may be connected via USB. The voice sending module may be further configured to: obtain the second voice information, and send the second voice information to the second device through USB redirection.

In some embodiments, a voice information processing apparatus applied to a second device may include a voice assistant launching module, an event determination module and an information feedback module. The voice assistant launching module may be configured to: launch a voice assistant in response to a voice assistant wakeup instruction. The voice assistant wakeup instruction may be sent by a first device to the second device in response to determining that first voice information includes a wakeup keyword. The event determination module may be configured to: obtain second voice information sent by the first device; and determine, by using the voice assistant, a voice triggered event corresponding to the second voice information. The information feedback module may be configured to: feed target information associated with performance of the voice triggered event back to the first device, such that the first device may perform the voice triggered event based on the target information.

In some embodiments, the information feedback module may be further configured to: send, in response to launching the voice assistant, a three-dimensional interface image of the voice assistant to the first device, such that the first device may display the three-dimensional interface image of the voice assistant at a display. The three-dimensional interface image of the voice assistant may be rendered and generated by the second device.

In some embodiments, a computer-readable storage medium storing a computer program is provided. The computer program may be executed by a processor to implement the voice information processing method as mentioned above.

In some embodiments, an electronic device may include a processor and a memory. The memory may be configured to store one or more programs. When the processor executes the one or more programs, the processor may be enabled to implement the voice information processing method as mentioned above.

FIG. 1 illustrates a schematic diagram of an exemplary system architecture for applying a voice information processing scheme according to an embodiment of the present disclosure.

As shown in FIG. 1, the system architecture may include a first device 1100 and a second device 1200. The first device 1100 may be a device configured to receive voice information and perform an event corresponding to the voice information. Specifically, the first device 1100 may be an AR (Augmented Reality) glass, a VR (Virtual Reality) glass or an MR (Mixed Reality) glass. However, the first device 1100 may also be other kind of wearable device with a display function, such as a smart helmet and the like. The second device 1200 may be a device configured with a voice assistant. The second device 1200 may analyze the voice information received from the first device 1100 by using the voice assistant, determine the event corresponding to the voice information, and feed the relevant information back to the first device 1100, such that the first device 1100 may perform the event corresponding to the voice information. Specifically, the second device 1200 may be a mobile phone, a tablet, a personal computer, etc.

In the voice information processing process according to some exemplary embodiments of the present disclosure, the first device 1100 may first obtain the first voice information, perform a keyword recognition on the first voice information, and determine whether the first voice information includes a wakeup keyword. In a case in which the first voice information includes the wakeup keyword, the first device 1100 may send a voice assistant wakeup instruction to the second device 1200. In response to the voice assistant wakeup instruction, the second device 1200 may launch, start or activate the voice assistant installed on the second device 1200.

Next, if the first device 1100 obtains second voice information, the first device 1100 may then send the second voice information to the second device 1200. The second device 1200 may use the voice assistant to determine a voice triggered event corresponding to the second voice information, and send target information associated with the voice triggered event to the first device 1100. The first device 1100 may perform the voice triggered event based on the target information.

In some embodiments, the process of determining the voice triggered event by the second device 1200 may only be implemented by the second device. In other words, the second device 1200 may use the voice assistant to analyze the second voice information (including but being not limited to automatic speech recognition, semantic category parsing, text to speech and other operations), and determine the voice triggered event based on the analysis results.

In some other embodiments, the architecture implementing the voice information processing process of the present disclosure may also include a server 1300. In this case, the second device 1200 may send the second voice information to the server 1300. The server 1300 may analyze the second voice information, and feed the analysis results back to the second device 1200.

It should be noted that, the present disclosure does not limit the types of voice triggered events. Taking the first device 1100 being an AR glass for an example, the voice triggered event may include adjusting volume of the AR glass, checking the weather, answering a phone call, setting a calendar schedule, recording a screen, taking a screenshot, opening/closing an album, opening/closing a specified application, shutting down a machine, etc.

Alternatively, the second device 1200 may send a user interface (UI) of the voice assistant and/or the voice triggered event to the first device 1100 for displaying.

It should be noted that, the user interface sent by the second device 1200 to the first device 1100 for displaying by the first device 1100 may be different from the user interface displayed by the second device 1200 itself. Specifically, the user interface sent by the second device 1200 to the first device 1100 may be a three-dimensional interface image rendered and generated by the second device 1200 or the server 1300, while the user interface displayed by the second device 1200 itself may typically be a two-dimensional interface. There are also differences in the ways the two kinds of interfaces are arranged and contents of the two kinds of interfaces.

In an embodiment in which the first device 1100 is for example an AR glass, a three-dimensional stereoscopic effect can be presented for the user to view.

FIG. 2 illustrates a schematic diagram of an electronic device suitable for implementing an exemplary embodiment of the present disclosure. The first device and/or the second device in the exemplary embodiment of the present disclosure may be configured in the form shown in FIG. 2. It should be noted that, the electronic device illustrated in FIG. 2 is only an example, and should not impose any limitations on the functionalities and scopes of application of embodiments of the present disclosure.

The electronic device in the present disclosure may at least include a processor and a memory. The memory may be configured to store one or more programs. When the one or more programs are executed by the processor, the processor may be enabled to implement the voice information processing method of exemplary embodiments of the present disclosure.

Specifically, as shown in FIG. 2, the electronic device 200 may include: a processor 210, an internal memory 221, an external memory interface 222, a Universal Serial Bus (USB) interface 230, a charge management module 240, a power source management module 241, a battery 242, an antenna 1, an antenna 2, a mobile communication module 250, a wireless communication module 260, an audio module 270, a speaker 271, a voice receiver 272, a microphone 273, an earphone interface 274, a sensor module 280, a display screen 290, a camera module 291, an indicator 292, a motor 293, a button 294 and a subscriber identification module (SIM) card interface 295, etc. The sensor module 280 may include a depth sensor, a pressure sensor, a gyroscope sensor, a barometric sensor, a magnetic sensor, an acceleration sensor, a distance sensor, a optical proximity sensor, a fingerprint sensor, a temperature sensor, a touch sensor, an ambient light sensor and a bone conduction sensor, etc.

It should be appreciated that, the structure illustrated in embodiments of the present application does not constitute specific limitations to the electronic device 200. In some other embodiments of the present disclosure, the electronic device 200 may include more or fewer components than those illustrated in the figures, a combination of certain components, split parts of certain components or a different arrangement of components. The illustrated components may be implemented as hardware, software, or a combination of software and hardware.

The processor 210 may include one or more processing units. For example, the processor 210 may include an application processor (AP), a modem processor, a graphics processing unit (GPU), an image signal processor (ISP), a controller, a video codec, a digital signal processor (DSP), a baseband processor, and/or a neural-network processing unit (NPU), etc. Among these processing units, different processing units may be independent devices or integrated in one or more processors. In addition, a memory may be provided in the processor 210 for storing instructions and data.

The USB interface 230 is an interface that conforms to the USB standard specification. Specifically, the USB interface 230 may be a MiniUSB interface, a MicroUSB interface, a USBTypeC interface, etc. The USB interface 230 may be configured to connect the electrical charger to charge the electronic device 200, and may also be configured to transfer data between the electronic device 200 and peripheral devices. The USB interface 230 may also be configured to connect an earphone and play audio through the earphone. The interface may also be configured to connect other electronic devices, such as an AR device, etc.

The charge management module 240 is configured to receive charge input from the electrical charger. The electrical charger may be a wireless charger or a wired charger. The power source management module 241 may be configured to connect a battery 242, the charge management module 240 and the processor 210. The power source management module 241 may receive an input from the battery 242 and/or the charge management module 240, to supply power to the processor 210, the internal memory 221, the display screen 290, the camera module 291 and the wireless communication module 260, etc.

The wireless communication function of the electronic device 200 may be implemented by the antenna 1, the antenna 2, the mobile communication module 250, the wireless communication module 260, the modem processor and the baseband processor, etc.

The mobile communication module 250 can provide solutions for wireless communication including 2G/3G/4G/5G and the like applied to the electronic device 200.

The wireless communication module 260 may provide solutions for wireless communication applied to the electronic device 200. The wireless communication may include the wireless local area network (WLAN) (e.g., Wireless Fidelity (Wi-Fi) network), the Bluetooth (BT), the Global Navigation Satellite System (GNSS), the Frequency Modulation (FM), the Near Field Communication (NFC), the Infrared (IR) technology and the like.

The electronic device 200 may implement a display function through the GPU, the display screen 290 and the application processor, etc. The GPU is a microprocessor for image processing. The GPU may connect the display screen 290 to the application processor. The GPU may be configured to perform mathematical and geometric computation for graphics rendering. The processor 210 may include one or more GPUs that execute program instructions to generate or change display information.

The electronic device 200 may implement the image or video shooting function through the ISP, the camera module 291, the video codec, the GPU, the display screen 290 and the application processor. In some embodiments, the electronic device 200 may include 1 or N camera modules 291, wherein N is a positive integer greater than 1. If the electronic device 200 includes N cameras, then one of the N cameras is a primary camera.

The internal memory 221 may be configured to store computer executable program code. Said executable program code includes instructions. The internal memory 221 may include a program storage area and a data storage area. The external memory interface 222 may be configured to connect an external memory card, such as a Micro SD card, to enable expansion of storage capacity of the electronic device 200.

The electronic device 200 may implement the audio function through the audio module 270, the speaker 271, the voice receiver 272, the microphone 273, the earphone interface 274 and the application processor. The audio function may be music playback, voice recording, etc.

The audio module 270 may be configured to convert digital audio information to analog audio signal output, and also convert analog audio input to digital audio signal. The audio module 270 may also be configured to encode and decode the audio signal. In some embodiments, the audio module 270 may be arranged in the processor 210, or some of the functional units of the audio module 270 may be arranged in the processor 210.

The speaker 271, also known as a "horn", may be configured to convert an audio electrical signal into a sound signal. Listening of music or hands free calls may be realized through the speaker 271 of the electronic device 200. The voice receiver 272, also known as the "handset", may be configured to convert the audio electrical signal into the sound signal. When the electronic device 200 is used to answer a call or listen to a voice information, the voice can be received by putting the voice receiver 272 at a position close to a human ear. The microphone 273, also known as a "voice tube", "mike", may be configured to convert the sound signal into an electrical signal. When making a call or sending a voice information, the user may input the sound signal to the microphone 273 by letting the human mouth to be close to the microphone 273 to make the sound. At least a microphone 273 may be arranged in the electronic device 200. The earphone interface 274 may be configured to connect a wired earphone.

For the sensors that may be included in the sensor module 280 of the electronic device 200, the depth sensor may be configured to obtain depth information of the scene. The pressure sensor may be configured to sense a pressure signal, and may convert the pressure signal into an electrical signal. The gyroscope sensor may be configured to determine a motion attitude of the electronic device 200. The barometric sensor may be configured to measure the air pressure. The magnet sensor may include a Hall sensor. The electronic device 200 may use the magnetic sensor to detect opening and closing of a flip leather cover. The acceleration sensor may detect a magnitude of acceleration of the electronic device 200 in all directions (typically in three axes). The distance sensor may be configured to measure distance. The optical proximity sensor may include, for example, a light emitting diode (LED) and a light detector, such as a photodiode. The fingerprint sensor may be configured to collect fingerprints. The temperature sensor may be configured to detect temperature. The touch sensor may communicate an detected touch operation to the application processor, to determine the type of a touch operation. A visual output associated with the touch operation can be provided through the display screen 290. The ambient light sensor may be configured to sense the brightness of the ambient light. The bone conduction sensor can acquire a vibration signal.

The button 294 may include a power button and a volume button, etc. The button 294 can be a mechanical button. The button 294 can also be a tactile button. The motor 293 can generate a vibration prompt or vibration alert. The motor 293 may be configured for vibration alert of incoming calls, or may be configured for tactile vibration feedback. The indicator 292 may be an indicator light, which may be configured to indicate charging status, battery level changes, or to indicate messages, missed calls, notifications, etc. The SIM card interface 295 may be configured to connect an SIM card. The electronic device 200 may interact with the network through the SIM card, to enable functions such as calls and data communication.

A computer-readable storage medium may also be provided in the present disclosure. The computer-readable storage medium may be included in the electronic device described in the above embodiments. The computer-readable storage medium may also be separately provided and not assembled into the electronic device.

The computer-readable storage medium may be, for example but not limited to—electrical, magnetic, optical, electro-magnetic, infrared, or semiconducting systems, apparatuses or devices, or any combination thereof. More specific examples of the computer-readable storage medium may include, but be not limited to: an electrical connection with one or more conducting wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic memory device, or any suitable combination thereof. In the present disclosure, the computer-readable storage medium may be any tangible medium that includes or stores a program that may be used by or used in combination with an instruction executing system, a device or an apparatus.

The computer-readable storage medium may send, transmit, or transfer programs for being used by or in conjunction with an instruction executing system, a device or an apparatus. The program code included on the computer-readable storage medium may be transmitted by any suitable medium, including but being not limited to: a wireless medium, an electric wire, an optical cable an RF, etc., or any suitable combination thereof.

The computer-readable storage medium may carry one or more programs. When the one or more programs are executed by an electronic device, the electronic device may be caused to implement the method as described in the following embodiments.

The flowcharts and block diagrams in the accompanying drawings illustrate the system architectures, functionalities and operations that are possible to be realized according to the systems, methods and computer program products according to various embodiments of the present disclosure. At this point, each block in a flowchart or a block diagram may represent a module, a program segment, or a portion of codes. The above-mentioned module, program segment or portion of codes includes one or more executable instructions for implementing a specified logical function. It should also be noted that, in some implementations as alternatives, the functions indicated in the blocks may also occur in a order different than that indicated in the accompanying drawings. For example, two blocks represented one after another may actually be executed substantially concurrently, or sometimes they may be executed in a reverse order. The actual order may depend on the function involved. It should also be noted that, each block in a block diagram or a flowchart, and the combination of blocks in the block diagram or the flowchart, may be implemented with a dedicated hardware-based system that performs a specified function or operation, or may be implemented by a combination of a dedicated hardware and computer instructions.

The units described and involved in the embodiments of the present disclosure may be implemented by software or hardware, and the units described may also be arranged in a processor. In some cases, the names of these units do not impose a limitation to the unit itself.

FIG. 3 schematically illustrates a flowchart of a voice information processing method performed by the first device according to an exemplary embodiment of the present disclosure. The voice information processing method performed by the first device may include operations at blocks illustrated in FIG. 3.

At block S32: obtaining first voice information, sending, in response to the first voice information including a wakeup keyword, a voice assistant wakeup instruction to the second device, such that the second device launches a voice assistant.

In some exemplary embodiments of the present disclosure, the first device may be equipped with a voice collecting apparatus. Specifically, the first device may be equipped with a single microphone or a microphone array, to obtain voice information around the first device.

In addition, the first device may also be equipped with a DSP (Digital Signal Process) chip. The DSP chip may be configured to analyze the first voice information in response to the first voice information being obtained, to determine whether the first voice information includes a wakeup keyword. The wakeup keyword may be configured to wake up the voice assistant in the second device.

It should be easily understand that, the first device is usually equipped with a sound card. In some embodiments, the voice collecting apparatus and the DSP chip equipped in the first device may both be connected to the sound card. Through the sound card, the first voice information obtained by the voice collecting apparatus may be sent to the DSP chip. However, in this case, the sound card needs to be activated in order for the DSP chip to obtain the first voice information.

In some other embodiments, the voice collecting apparatus equipped in the first device may be directly connected to the DSP chip. In this way, the process of obtaining the first voice information by the DSP chip can be achieved without depending on the activation of the sound card.

For the operation at block S32, the voice collecting apparatus of the first device may obtain the first voice information. The DSP chip may analyze the first voice information, to determine whether the first voice information includes the wakeup keyword. In response to the first voice information including the wakeup keyword, the first device can send the voice assistant wakeup instruction to the second device. The second device may launch the voice assistant in response to the voice assistant wakeup instruction.

In some embodiments of the present disclosure, the first device may be connected to the second device via a USB. This wired connection of USB may avoid the problem of frame loss in information transmission, and increase voice processing accuracy.

In some other embodiments of the present disclosure, the first device may also be connected to the second device by means of Bluetooth or Wi-Fi, which is not limited in the present disclosure.

It should be appreciated that, until the first voice information including the wakeup keyword is obtained by the first device, the voice assistant of the second device may be in a closing state and the whole system is in a semi-sleep state or a semi-hibernate state, thereby facilitating reduction of the consumption of the system.

In addition, after the second device launches the voice assistant, the second device may send a first three-dimensional interface image of the voice assistant to the first device, such that the first three-dimensional interface image of the voice assistant may be displayed at a display or display terminal of the first device. For example, the user can see the first three-dimensional interface image of the voice assistant on the lens of the AR glass, thus the user is indicated or informed of the launch of the voice assistant, and the voice command can be recorded and input.

The first three-dimensional interface image of the voice assistant may be rendered and generated by the second device. Specifically, the first three-dimensional interface image may be an image generated by rendering in response to the voice assistant wakeup instruction. The first three-dimensional interface image may also be an image generated by rendering and stored in advance, and may be retrieved and called-out in response to the voice assistant wakeup instruction. The way and time of rendering is not limited in the present disclosure.

At block S34: obtaining second voice information and sending the second voice information to the second device, such that the second device determines a voice triggered event by using the voice assistant.

In the case where the second device launches the voice assistant, the microphone of the first device can obtain the second voice information and send the second voice information to the second device. It should be understood that, in the case where the voice assistant of the second device is launched, the first device may control the DSP chip for wakeup keyword recognition to be in a sleep state.

In the case where the first device is connected to the second device via the USB, the second voice information may be made available to the second device by means of USB redirection. That is, the voice collecting apparatus of the first device may be redirected to be a voice input of the second device, and the voice assistant of the second device can listen to or monitor the voice recorded by the first device.

For the USB redirection process specifically, first, a service matching with the first device in the second device may listen to a USB insertion event of the first device. The USB insertion event of the first device may be an event in which a USB terminal from the first device is inserted in the second device. Further, the USB insertion event of the first device may be an event in which the first device is connected to the second device via USB. It should be understood that, the service may only respond to the USB insertion event of the first device, and do not respond to USB insertion events of other devices. Next, the second device can reset its own voice collecting apparatus as the voice collecting apparatus of the first device via a callback function.

In an embodiment where the first device is an AR glass and the second device is a mobile phone, first, an AR service of the mobile phone may listen to the USB insertion event of an AR glass, and may also provide a security authentication for the AR glass. Next, the mobile phone may reset its voice collecting apparatus as the microphone of the AR glass. That is, the voice collecting apparatus of the AR glass is used as the voice collecting apparatus of the mobile phone. Then, voice information may be input by the user through the microphone of the AR glass directly. The voice information will be directly transmitted to the voice collecting apparatus of the mobile phone and transferred to an upper layer application (i.e., voice assistant) in the mobile phone that enables an interaction with the AR glass.

According to some embodiments of the present disclosure, the second device may use the voice assistant to analyze the second voice information (including but being not limited to automatic speech recognition, semantic category parsing, text to speech and other operations), to determine the voice triggered event corresponding to the second voice information. For an example, the voice triggered event resulted from the analysis is "turning down the volume". For another example, the voice triggered event resulted from the analysis is "powering off the device". For yet another example, the voice triggered event from the analysis is "opening the album", etc.

In these embodiments, these operations can be achieved when the second device is not connected to the network (i.e., not connected to a server).

According to some other embodiments of the present disclosure, the second device may use the voice assistant to send the second voice information to the server. The server may analyze the second voice information, determine the voice triggered event, and feed the voice triggered event back to the second device. In addition, the server can realize a dynamic capacity expansion service according to actual business demand.

In some embodiments, the server may determine the voice triggered event based on a first voice processing process. The first voice processing process may include: first, the server may perform automatic speech recognition on the second voice information, to convert the second voice information into text information; next, the server may perform semantic category parsing on the text information, to determine the semantics corresponding to the text information, and generate a semantic category parsing result, the semantic category parsing result may be presented in the form of text; then, the server may determine a voice triggered event corresponding to the second voice information based on the semantic category parsing result. In this case, the voice triggered event may for example be an event of controlling the first device. For example, the voice triggered event is controlling the first device to power off.

In some embodiments, the server may determine a voice triggered event based on a second voice processing process. The second voice processing process may include: first, the server may perform automatic speech recognition on the second voice information, to convert the second voice information into text information; next, the server may perform semantic category parsing on the text information, to obtain a automatic speech recognition result; then, the server may determine a response text corresponding to the second voice information based on the automatic speech recognition result, and convert the response text into third voice information, the third voice information is taken as the information contained in the voice triggered event. In this case, the second voice information may be information for inquiring the weather, the corresponding voice triggered event may be voice broadcast of the weather, while the above response text may refer to real-time weather information determined in the form of text. The third voice information is a voice information generated by a process of text-to-voice conversion of the response text, and may correspond to target information fed back to the second device as described below. For example, the third voice information may be "sunny", "light rain" and other voice information related to the real-time weather.

It should be noted that, on the one hand, the above-mentioned voice analysis process is only an example, and the present disclosure does not limit the specific process. On the other hand, the above-mentioned voice analysis process can also be implemented on the second device, in which case the solution may not require participation of the server.

At block S36: receiving the target information fed back by the second device, and performing the voice triggered event based on the target information.

After the second device has determined the voice triggered event corresponding to the second voice information, the second device may determine the target information associated with the performance or execution of the voice triggered event and send the target information to the first device, such that the first device may perform the voice triggered event based on the target information. The target information may be an instruction to control a state of the first device, or may be information associated with displaying content corresponding to the voice triggered event.

Take the voice triggered event as "turning down the volume" for an example, the target information may be an instruction to turn down the volume of the first device, and the first device can turn down its own volume after receiving the instruction.

For example, take the voice triggered event as "opening album" for an example, the target information may include information of each image in the album, such that the first device can display the images included in the album on the display of the first device after receiving the target information. For example, photos included in the album can be displayed on the lens of the AR glass.

For example, take the voice triggered event as "powering off the device" for an example, the target information may be an instruction to control the first device to power off, and the first device may power off after receiving the instruction.

It will be appreciated that, a mapping relationship of voice triggered events to local system commands may be integrated in the voice assistant of the second device, such that these system commands may be used to control the first device if the voice triggered events are identified.

In addition, after the second device has determined a voice triggered event by using the voice assistant, some exemplary embodiments of the present disclosure may further include a scheme for sending the second three-dimensional interface image corresponding to the voice triggered event to the first device.

Specifically, the second device may determine the second three-dimensional interface image corresponding to the voice triggered event, and send the second three-dimensional interface image to the first device, such that the first device may display the second three-dimensional interface image on the display. For example, the user can see the second three-dimensional interface image corresponding to "turning down the volume" on the lens of the AR glass.

Similar to the first three-dimensional interface image of the voice assistant described above, the second three-dimensional interface image corresponding to the voice triggered event may be rendered and generated by the second device. The way and time of rendering is not limited in the present disclosure. It should be appreciated that, the three-dimensional interface images described in the present disclosure may include one or more kinds of combinations of characters, symbols, still pictures, motion pictures and videos.

Considering a problem that the user may not make a voice for a long period of time and an increase in power consumption is thereby caused, in some embodiments of the present disclosure, after the first device sends the voice assistant wakeup instruction to the second device, the first device starts a timer. After a predefined time period (e.g., 20 seconds), if the second voice information is not obtained, then the first device may send a voice assistant closing instruction to the second device, and the second device may close or turn off the voice assistant in response to the voice assistant closing instruction.

Alternatively, the second device may count time by itself, and after a predefined time period, if no second voice information is obtained, then the second device may close the voice assistant itself.

Figure 4:
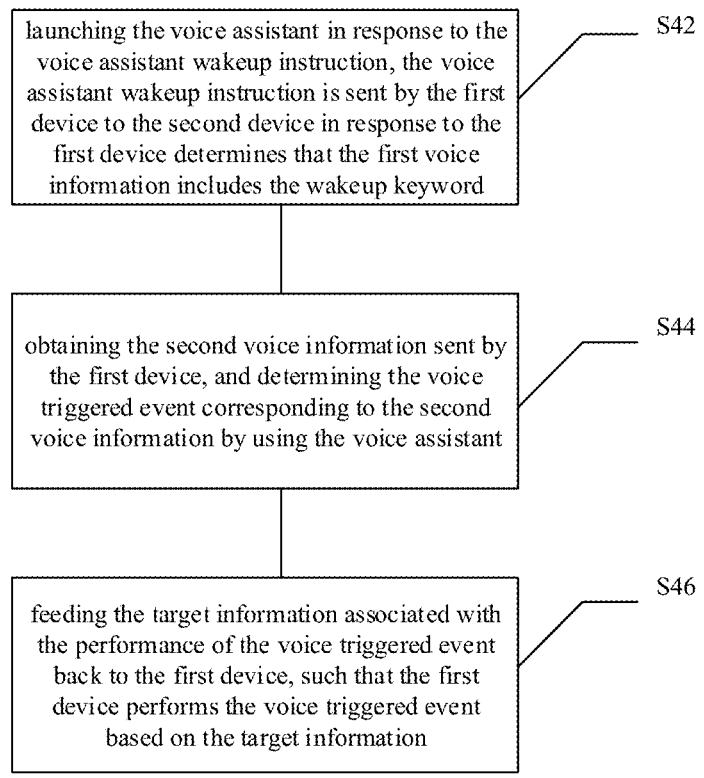
FIG. 4 schematically illustrates a flowchart of a voice information processing method performed by a second device according to an exemplary embodiment of the present disclosure.

A flowchart of a voice information processing method performed by the second device is also provided in some exemplary embodiments of the present disclosure. The voice information processing method performed by the second device may include operations at blocks illustrated in FIG. 4.

At block S42: launching the voice assistant in response to the voice assistant wakeup instruction, the voice assistant wakeup instruction is sent by the first device to the second device when it is determined that the first voice information includes the wakeup keyword.

At block S44: obtaining the second voice information sent by the first device, and determining the voice triggered event corresponding to the second voice information by using the voice assistant.

At block S46: feeding the target information associated with the performance of the voice triggered event back to the first device, such that the first device may perform the voice triggered event based on the target information.

The specific processes of operations S42 to S46 have been described above in detail in operations at blocks S32 to S36 and will not be repeated here.

Figure 5:
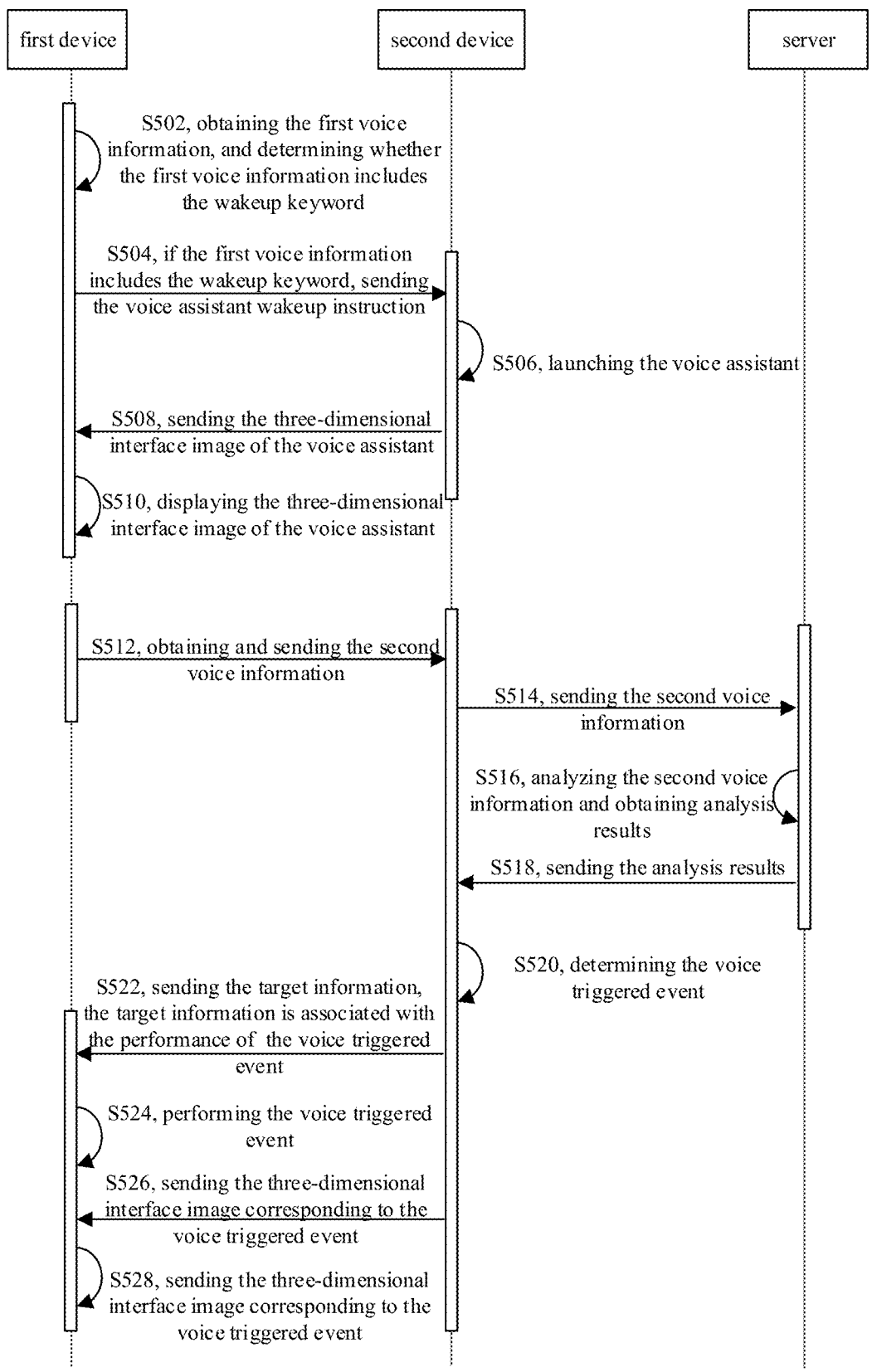
FIG. 5 schematically illustrates a diagram of device interaction for implementing a voice information processing process according to an exemplary embodiment of the present disclosure.

As shown in FIG. 5, a diagram of device interaction that implements the voice processing process according to some embodiments of the present disclosure will be illustrated below.

In an operation at block S502, the first device may obtain the first voice information, and determine whether the first voice information includes the wakeup keyword by the DSP chip equipped in the first device. The wakeup keyword may be a user-defined keyword, for example, "Xiao Bu". In the operation at block S504, if the first voice information includes the wakeup keyword, then the first device can send the voice assistant wakeup instruction to the second device.

In an operation at block S506, the second device may launch the voice assistant. Further, in an operation at block S508, the second device may send the first three-dimensional interface image of the voice assistant to the first device. In an operation at block S510, the first device may display the first three-dimensional interface image of the voice assistant on its display. For example, the first three-dimensional interface image of the voice assistant may be displayed on the lens of the AR glass.

Operations at blocks S502 to S510 exemplarily describe the process of launching the voice assistant of the second device via the wakeup service of the first device. The process of controlling the first device via voice will be described below with reference to operations at blocks S512 to S528.

In an operation at block S512, the first device may obtain the second voice information, and send the second voice information to the second device.

In an operation at block S514, the second device may send the second voice information to the server. In an operation at block S516, the server may analyze the second voice information and obtain the analysis results. In operation at block S518, the server may feed the analysis results of the second voice information back to the second device. In an operation at block S520, the second device may determine the voice triggered event based on the analysis results of the server.

In operation at block S522, the second device may send the target information to the first device. The target information is associated with the performance of the voice triggered event. That is, the target information may be information necessary for the first device to be able to execute the voice triggered event. In an operation at block S524, the first device may perform the voice triggered event.

Further, in an operation at block S526, the second device may send the second three-dimensional interface image corresponding to the voice triggered event to the first device. In an operation at block S528, the first device may display the second three-dimensional interface image corresponding to the voice triggered event.

Figure 6:
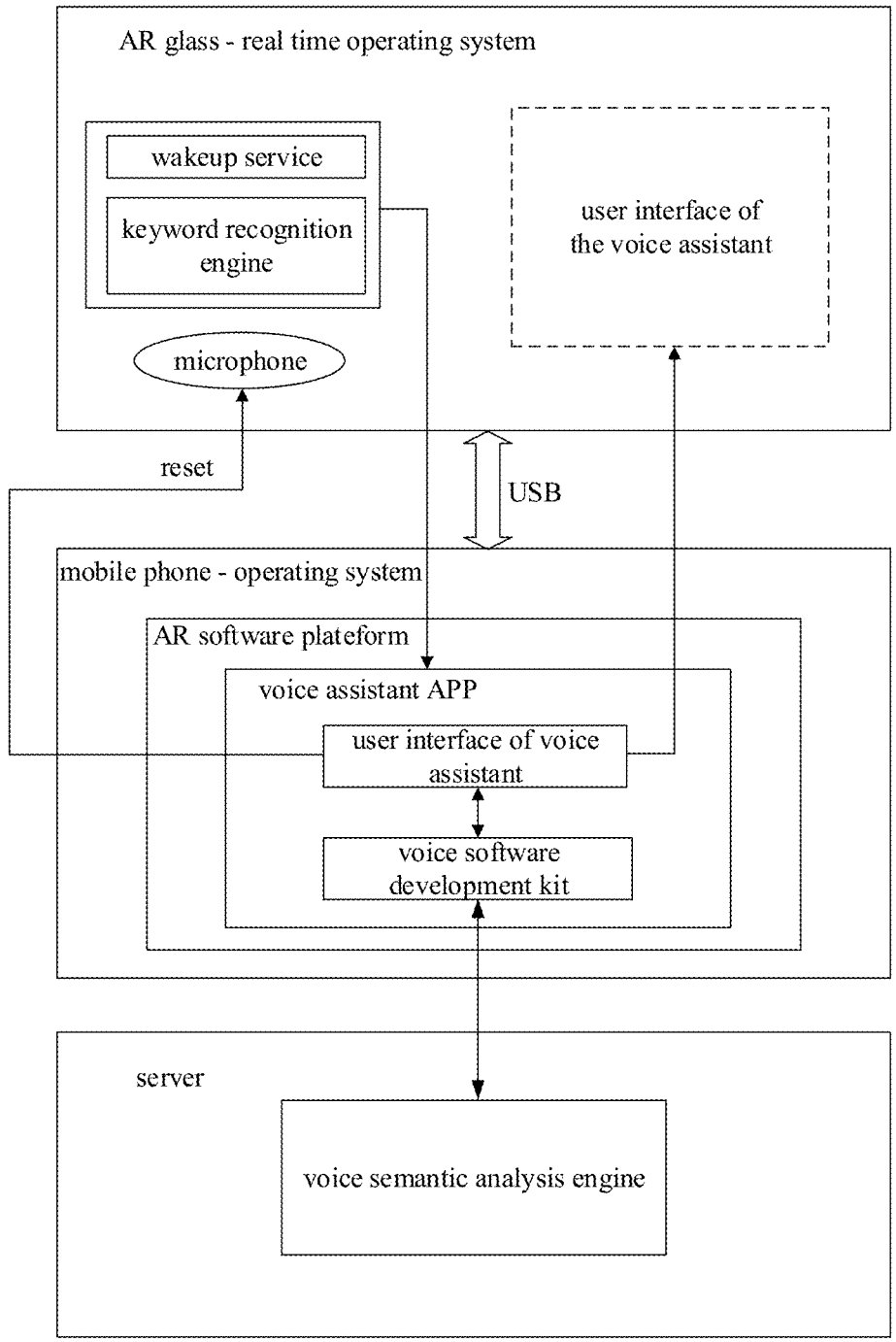
FIG. 6 schematically illustrates a diagram of an overall hardware and software architecture of a voice information processing scheme according to an embodiment of the present disclosure.

As shown in FIG. 6, the overall hardware and software architecture of the voice information processing scheme according to some embodiments of the present disclosure will be described below. In these embodiments, the first device may be an AR glass and the second device may be a mobile phone. The AR glass may be connected to the mobile phone via USB. The mobile phone and the server may be connected via 3G, 4G, 5G, Wi-Fi, etc.

For the AR glass, the operating system on it can be an RTOS (real time operating system). The AR glass itself may be equipped with a DSP chip for providing the wakeup service. When the microphone of the AR glass obtains the above-mentioned first voice information, a keyword recognition engine may be configured to determine whether the first voice information includes the wakeup keyword. In addition, when the voice assistant of the mobile phone is waked up, the AR glass can present the first three-dimensional user interface of the voice assistant rendered by the mobile phone.

For the mobile phone, an AR software platform (e.g., ARCore or ARKit) may be configured in the operating system. On the basis of the AR software platform, a voice assistant application (APP) can be configured. The voice assistant APP can be launched in response to instructions generated by the wakeup service of the AR glass. The microphone of the AR glass may be reset through UI interaction with the voice assistant user interface. In addition, the voice assistant user interface of the mobile phone may also correspond to the user interface of the voice assistant displayed on the AR glass.

In addition, with the assistance of the voice software development kit provided by the voice assistant APP in the mobile phone, an interaction with the server's voice semantic analysis engine can be realized, such that the above-mentioned second voice information may be sent to the server, the voice semantic analysis engine of the server may analyze the second voice information and feedback the analysis results.

It should be noted that, the architecture shown in FIG. 6 is only an example, and should not be construed as a limitation to the present disclosure.

It should be noted that, although each operation of the method in the present disclosure is shown in the accompanying drawings in a particular order, but it is not required or implied that, these operations must be performed in that particular order or that all of the operations listed must be performed to achieve a desired result. Additionally or alternatively, certain operations may be omitted, multiple operations may be combined into a single operation, and/or a single operation may be split into multiple operations to perform, etc.

Further, a voice information processing apparatus applied to the first device may also be provided according to some embodiments of the present disclosure.

Figure 7:
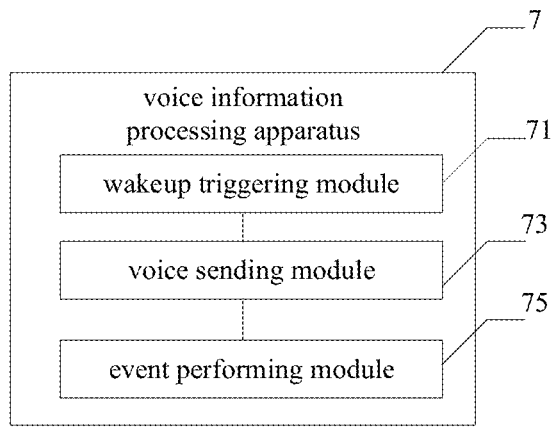
FIG. 7 schematically illustrates a block diagram of a voice information processing apparatus applied to the first device according to an exemplary embodiment of the present disclosure.

FIG. 7 schematically illustrates a block diagram of the voice information processing apparatus applied to the first device according to some exemplary embodiments of the present disclosure. As shown in FIG. 7, the voice information processing apparatus 7 applied to the first device according to some exemplary embodiments of the present disclosure may include a wakeup triggering module 71, a voice sending module 73 and an event performing module 75.

Specifically, the wakeup triggering module 71 may be configured to obtain the first voice information, send, in response to the first voice information including the wakeup keyword, the voice assistant wakeup instruction to the second device, such that the second device may launch the voice assistant. The voice sending module 73 may be configured to obtain the second voice information and send the second voice information to the second device, such that the second device can determine the voice triggered event corresponding to the second voice information by using the voice assistant. The event performing module 75 may be configured to receive the target information associated with the performance of the voice triggered event fed back by the second device, and perform the voice triggered event based on the target information.

Figure 8:
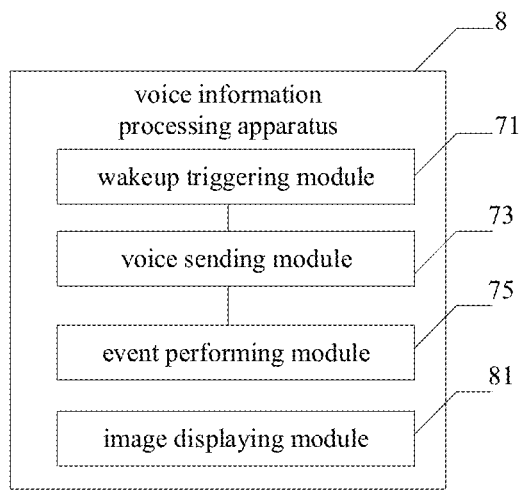
FIG. 8 schematically illustrates a block diagram of a voice information processing apparatus applied to the first device according to another exemplary embodiment of the present disclosure.

According to some exemplary embodiments of the present disclosure as shown in FIG. 8, in contrast with the voice information processing apparatus 7, the voice information processing apparatus 8 may also include an image displaying module 81.

Specifically, the image displaying module 81 may be configured to perform: receiving the first three-dimensional interface image of the voice assistant after the second device launches the voice assistant, the first three-dimensional interface image of the voice assistant may be rendered and generated by the second device; and displaying the first three-dimensional interface image of the voice assistant at the display of the first device.

According to some exemplary embodiments of the present disclosure, the first device may be connected to the second device via USB. In this case, the voice sending module 73 may be configured to perform: obtaining the second voice information; sending the second voice information to the second device by means of USB redirection.

According to some exemplary embodiments of the present disclosure, the image displaying module 81 may further be configured to perform: receiving the second three-dimensional interface image corresponding to the voice triggered event, the second three-dimensional interface image corresponding to the voice triggered event may be rendered and generated by the second device; and displaying the second three-dimensional interface image corresponding to the voice triggered event at the display of the first device.

Figure 9:
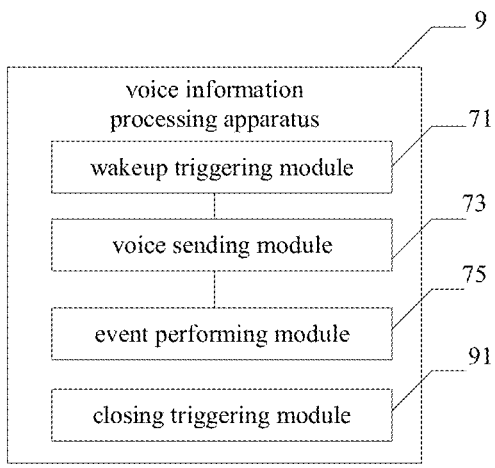
FIG. 9 schematically illustrates a block diagram of a voice information processing apparatus applied to the first device according to yet another exemplary embodiment of the present disclosure.

According to some exemplary embodiments of the present disclosure as shown in FIG. 9, in contrast with the voice information processing apparatus 7, the voice information processing apparatus 9 may further include a closing triggering module 91.

Specifically, the closing triggering module 91 may be configured to perform: starting or initiating a timer after sending the voice assistant wakeup instruction to the second device; and after a predefined time period has passed, sending a voice assistant closing instruction to the second device if the second voice information is not obtained, such that the second device may close the voice assistant.

Further, a voice information processing apparatus applied to the second device is also provided in some exemplary embodiments.

Figure 10:
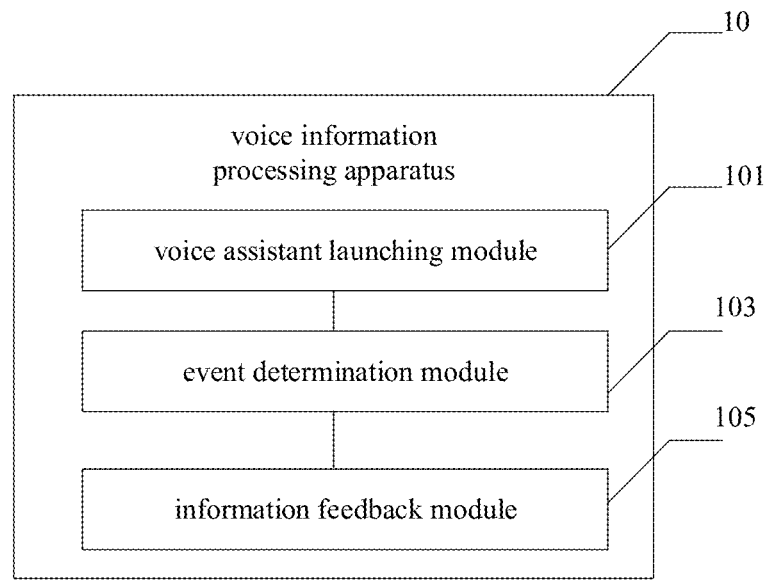
FIG. 10 schematically illustrates a block diagram of a voice information processing apparatus applied to the second device according to an exemplary embodiment of the present disclosure.

FIG. 10 schematically illustrates a block diagram of a voice information processing apparatus applied to the second device according to some exemplary embodiments of the present disclosure. As shown in FIG. 10, the voice information processing apparatus 10 applied to the second device according to some exemplary embodiments of the present disclosure may include a voice assistant launching module 101, an event determination module 103 and an information feedback module 105.

Specifically, the voice assistant launching module 101 may be configured to launch the voice assistant in response to the voice assistant wakeup instruction. The voice assistant wakeup instruction may be sent by the first device to the second device when it is determined that the first voice information includes the wakeup keyword. The event determination module 103 may be configured to obtain the second voice information sent by the first device, determine the voice triggered event corresponding to the second voice information by using the voice assistant. The information feedback module 105 may be configured to feed the target information associated with the performance of the voice triggered event back to the first device, such that the first device may perform the voice triggered event based on the target information.

According to some exemplary embodiments of the present disclosure, the information feedback module 105 may further be configured to perform: sending the first three-dimensional interface image of the voice assistant to the first device after the voice assistant is launched, such that the first device may display the first three-dimensional interface image of the voice assistant at the display. The first three-dimensional interface image of the voice assistant may be rendered and generated by the second device.

According to some exemplary embodiments of the present disclosure, the first device may be connected to the second device via USB. In this case, the process of obtaining the second voice information sent by the first device by the event determination module 103 may be configured to perform: obtaining the second voice information from the first device by means of USB redirection.

According to some exemplary embodiments of the present disclosure, the event determination module 103 may further be configured to perform: sending the second voice information to the server by the voice assistant, such that the server may determine the voice triggered event corresponding to the second voice information; and obtaining the voice triggered event corresponding to the second voice information as determined by the server.

According to some exemplary embodiments of the present disclosure, the information feedback module 105 may further be configured to perform, sending, after the voice triggered event corresponding to the second voice information is determined by using the voice assistant, the second three-dimensional interface image corresponding to the voice triggered event to the first device, such that the first device may display the second three-dimensional interface image corresponding to the voice triggered event at the display. The second three-dimensional interface image corresponding to the voice triggered event image may be rendered and generated by the second device.

Figure 11:
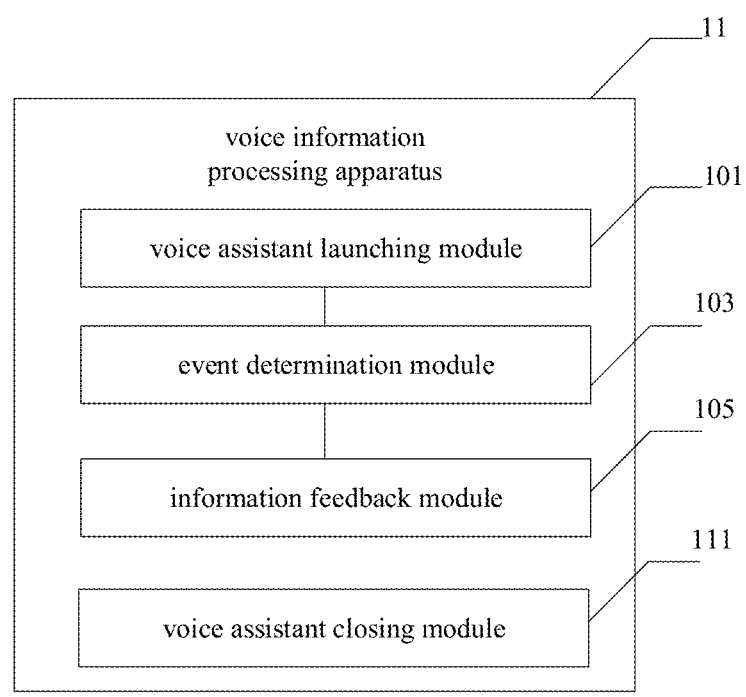
FIG. 11 schematically illustrates a block diagram of a voice information processing apparatus applied to the second device according to another exemplary embodiment of the present disclosure.

According to some exemplary embodiments of the present disclosure as shown in FIG. 11, in contrast with the voice information processing apparatus 10, the voice information processing apparatus 11 may further include a voice assistant closing module 111.

Specifically, the voice assistant closing module 111 may be configured to perform: closing the voice assistant in response to the voice assistant closing instruction.

Since the various functional modules of the voice information processing apparatus of this embodiment of the present disclosure are the same as those in the method embodiments described above, they will not be repeated here.

By the above description of the embodiments, those skilled in the art will readily understand that, the exemplary embodiments described herein may be implemented by means of software, or by means of software in combination with necessary hardware. Thus, a technical solution according to some embodiments of the present disclosure may be embodied in the form of a software product. The software product may be stored in a non-volatile storage medium (which may be a CD-ROM, a USB flash drive, a removable hard drive, etc.) or in a network. The software product may include a number of instructions, which may cause a computer device (which may be a personal computer, a server, a terminal apparatus, or a network device, etc.) to perform the method according to some embodiments of the present disclosure.

Further, the above-mentioned accompanying drawings are merely schematic illustrations of the processing included in the method according to exemplary embodiments of the present disclosure, and are not intended for limitation. It should be easily understood that, the processing shown in the above-mentioned accompanying drawings does not indicate or limit the time or temporal sequence of such processing. It should also be easily understood that, the processing may for example be performed in multiple modules either synchronously or asynchronously.

It should be noted that, although several modules or units of the device for executing actions are mentioned in the above detailed description, this kind of division is not mandatory. In fact, according to some embodiments of the present disclosure, the features and functions of two or more modules or units described above may be embodied in a single module or unit. Conversely, the feature and function of one module or unit described above may be further divided to be embodied by a plurality of modules or units.

Other embodiments of the present disclosure will readily occur to the minds of those skilled in the art upon review of the specification and practice of what is disclosed herein. The present disclosure may be intended to cover any variations, applications or adaptive changes of the present disclosure. These variations, applications or adaptive changes may follow the general principle of the present disclosure and include well known knowledge or customary technical schemes in the art that are not disclosed herein. The specification and embodiments should merely be considered as exemplary, and the true scope and spirit of the present disclosure is indicated by the claims.

It should be understood that, the present disclosure is not limited to the precise structure already described above and illustrated in the accompanying drawings, but various modifications and changes may be made without departing from the scope of the present disclosure. The scope of the present disclosure is only defined by the appended claim set.

What is claimed is:

1. A voice information processing method performed by a first device, comprising:
   obtaining first voice information;
   sending, in response to the first voice information comprising a wakeup keyword, a voice assistant wakeup instruction to a second device, wherein the voice assistant wakeup instruction is configured to make the second device launch a voice assistant installed on the second device, wherein the second device is a mobile phone or a tablet;
   obtaining second voice information;
   sending the second voice information to the second device, wherein the second device determines a voice triggered event corresponding to the second voice information by using the voice assistant; and
   receiving target information fed back from the second device, and performing the voice triggered event based on the target information,
   wherein in response to the second device launching the voice assistant, the voice information processing method further comprises:
      receiving a first three-dimensional interface image of the voice assistant, the first three-dimensional interface image of the voice assistant is generated by the second device; and
      displaying the first three-dimensional interface image of the voice assistant at a display of the first device.

2. The voice information processing method as claimed in claim 1, wherein:
   the first device and the second device are connected via USB;
   sending the second voice information to the second device comprises:

sending the second voice information to the second device through USB redirection, wherein the USB redirection is configured to redirect a voice collecting apparatus of the first device to be a voice input of the second device.

3. The voice information processing method as claimed in claim 1, further comprising:
receiving a second three-dimensional interface image corresponding to the voice triggered event; and
displaying the second three-dimensional interface image corresponding to the voice triggered event at a display of the first device.

4. The voice information processing method as claimed in claim 1, further comprising:
starting a timer while sending the voice assistant wakeup instruction to the second device; and
sending, in response to not obtaining the second voice information after a predefined time period, a voice assistant closing instruction to the second device, wherein the voice assistant closing instruction is configured to make the second device close the voice assistant.

5. An electronic device, comprising:
a processor; and
a memory, configured to store one or more programs,
wherein the electronic device is able to be used as a first device, such that when the processor executes the one or more programs, the processor is enabled to implement a voice information processing method, performed by the first device, comprises:
obtaining first voice information;
sending, in response to the first voice information comprising a wakeup keyword, a voice assistant wakeup instruction to a second device, wherein the second device is a mobile phone or a tablet, and the voice assistant wakeup instruction is configured to make the second device launch a voice assistant installed on the second device;
obtaining second voice information;
sending the second voice information to the second device, wherein the second device determines a voice triggered event corresponding to the second voice information by using the voice assistant; and
receiving target information fed back from the second device, and performing the voice triggered event based on the target information,
wherein in response to the second device launching the voice assistant, the voice information processing method further comprises:
receiving a first three-dimensional interface image of the voice assistant, the first three-dimensional interface image of the voice assistant is generated by the second device; and
displaying the first three-dimensional interface image of the voice assistant at a display of the first device, or
wherein the electronic device is able to be used as the second device being a mobile phone or a tablet, such that when the processor executes the one or more programs, the processor is enabled to implement a voice information processing method, performed by the second device, comprises:
launching, in response to the voice assistant wakeup instruction, the voice assistant installed on the second device, wherein the voice assistant wakeup instruction is sent, in response to the first device determining that first voice information comprises the wakeup keyword, by the first device to the second device;
obtaining the second voice information sent by the first device;
determining, by using the voice assistant, the voice triggered event corresponding to the second voice information; and
feeding the target information associated with performance of the voice triggered event back to the first device, such that the first device performs the voice triggered event based on the target information,
wherein in response to launching the voice assistant, the voice information processing method further comprises:
generating a first three-dimensional interface image of the voice assistant; and
sending the first three-dimensional interface image of the voice assistant to the first device, such that the first device displays the first three-dimensional interface image of the voice assistant at a display.

6. The electronic device as claimed in claim 5, wherein:
the first device and the second device are connected via USB;
sending the second voice information to the second device comprises:
sending the second voice information to the second device through USB redirection, wherein the USB redirection is configured to redirect a voice collecting apparatus of the first device to be a voice input of the second device.

7. The electronic device as claimed in claim 5, wherein the voice information processing method performed by the first device further comprises:
receiving a second three-dimensional interface image corresponding to the voice triggered event; and
displaying the second three-dimensional interface image corresponding to the voice triggered event at a display of the first device.

8. The electronic device as claimed in claim 5, wherein the voice information processing method performed by the first device further comprises:
starting a timer while sending the voice assistant wakeup instruction to the second device; and
sending, in response to not obtaining the second voice information after a predefined time period, a voice assistant closing instruction to the second device, wherein the voice assistant closing instruction is configured to make the second device close the voice assistant.

9. The electronic device as claimed in claim 5, wherein determining, by using the voice assistant, the voice triggered event corresponding to the second voice information comprises:
sending, by using the voice assistant, the second voice information to a server, such that the server determines the voice triggered event corresponding to the second voice information; and
obtaining the voice triggered event determined by the server, the voice triggered event corresponds to the second voice information.

* * * * *